US010064512B2

United States Patent
McMillion

(10) Patent No.: US 10,064,512 B2
(45) Date of Patent: Sep. 4, 2018

(54) SYSTEM AND APPARATUS FOR HANGING RODS

(71) Applicant: Cynthia Cloud McMillion, Frisco, TX (US)

(72) Inventor: Cynthia Cloud McMillion, Frisco, TX (US)

( * ) Notice: Subject to any disclaimer, the term of this patent is extended or adjusted under 35 U.S.C. 154(b) by 21 days.

(21) Appl. No.: 15/086,008

(22) Filed: Mar. 30, 2016

(65) Prior Publication Data

US 2016/0286999 A1   Oct. 6, 2016

Related U.S. Application Data

(60) Provisional application No. 62/142,365, filed on Apr. 2, 2015.

(51) Int. Cl.
| | |
|---|---|
| *A47H 1/10* | (2006.01) |
| *A47H 1/142* | (2006.01) |
| *F16B 2/22* | (2006.01) |
| *A47H 1/102* | (2006.01) |

(52) U.S. Cl.
CPC ............. *A47H 1/142* (2013.01); *A47H 1/102* (2013.01); *F16B 2/22* (2013.01)

(58) Field of Classification Search
USPC ..... 248/231.31, 231.81, 251, 252, 254, 261, 248/262
See application file for complete search history.

(56) References Cited

U.S. PATENT DOCUMENTS

| | | | | | |
|---|---|---|---|---|---|
| 3,199,823 | A | * | 8/1965 | Stall | A47H 1/122 248/207 |
| 3,430,908 | A | * | 3/1969 | Kowalczyk | A47H 1/102 211/105.2 |
| 3,704,851 | A | * | 12/1972 | Cormier | A47H 1/10 248/257 |
| 4,140,294 | A | * | 2/1979 | Zwarts | A47H 1/122 248/265 |
| 4,322,050 | A | * | 3/1982 | Roach | A47H 1/122 248/222.51 |
| 4,417,712 | A | * | 11/1983 | DeHart | G09F 7/18 248/220.22 |
| 5,582,303 | A | * | 12/1996 | Sloan | A47G 25/0692 211/105.1 |
| 5,979,848 | A | * | 11/1999 | Kuthy | A47H 1/10 160/902 |
| 6,719,156 | B2 | | 4/2004 | Ellbogen et al. | |
| 7,198,088 | B2 | | 4/2007 | McMenamin et al. | |
| 7,374,141 | B2 | | 5/2008 | Holden | |
| 8,104,149 | B1 | | 1/2012 | McGarity | |
| D658,043 | S | * | 4/2012 | Burr | D6/575 |
| 8,418,975 | B1 | * | 4/2013 | Burr | A47H 1/142 248/261 |
| 8,974,188 | B2 | | 3/2015 | Hou | |

(Continued)

*Primary Examiner* — Steven M Marsh
(74) *Attorney, Agent, or Firm* — Warren Rhoades LLP

(57) ABSTRACT

A rod hanging system for use with window blinds, the rod hanging system including a curtain rod brace including an attachment plate and a rod support branch with a rod notch, a mounting clip including a cavity, wherein the cavity removably receives the attachment plate of the curtain rod brace, and wherein the mounting clip further includes an attachment member that removably clasps the window blinds.

19 Claims, 7 Drawing Sheets

(56) References Cited

U.S. PATENT DOCUMENTS

2010/0001155 A1\* 1/2010 Grundy .................... A45F 5/02
                                                    248/231.81
2010/0224749 A1\* 9/2010 Tran ....................... A47H 1/142
                                                    248/262

\* cited by examiner

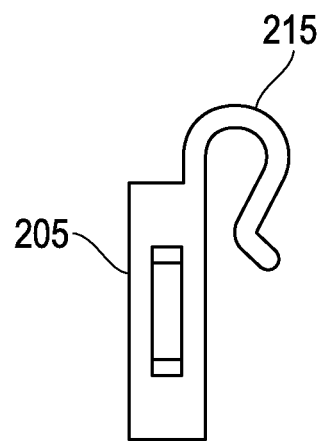
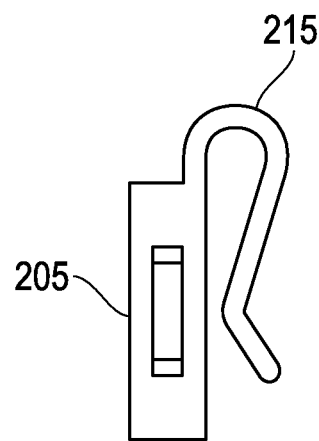
FIG. 7A    FIG. 7B
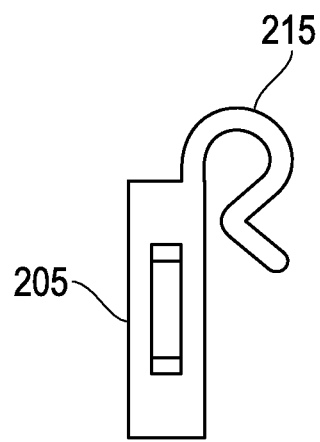
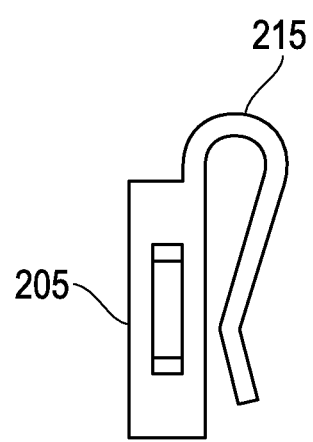
FIG. 7C    FIG. 7D

SYSTEM AND APPARATUS FOR HANGING RODS

CROSS-REFERENCES TO RELATED APPLICATIONS

This application claims priority benefit of U.S. Provisional Patent Application No. 62/142,365, filed on Apr. 2, 2015, of which the entirety is incorporated herein by reference.

FIELD OF THE INVENTION

The invention relates to a rod hanging system and apparatus, and more particularly, to removable, lightweight curtain rod clip for attachment to a preexisting window blind.

BACKGROUND

Current rod hanging systems include curtain rod braces that are permanently fastened to a wall surrounding a window. The curtain rod brace typically includes an attachment plate portion that is substantially perpendicular to a support arm. The curtain rod brace typically is formed in an "L" shape. The support arm may include a curved groove to support a curtain rod. The attachment plate portion typically includes multiple openings designed to accept screws for mounting to the wall surrounding the window. Installation requires the user to permanently fasten the curtain rod brace to the wall. Such installation is time consuming and difficult to accomplish. While many curtain rod braces exists in the prior art, none address near-instant installation and removability without marring the wall surrounding the window.

SUMMARY OF THE INVENTION

The present invention provides a system and apparatus for hanging rods. The rod hanging system includes a rod brace and an attachment or mounting clip that is attached to a preexisting structure, including a window blind or a mounting bracket. The attachment clip includes a fastener, including a spring clip, which is slid or clipped to the window blind or mounting bracket. The attachment clip further includes a slot or enclosed cavity or chamber. The rod brace includes a support arm and an attachment plate. In one embodiment, the rod brace is an "L" shaped bracket and the support arm is substantially perpendicular to the attachment plate. The attachment plate is inserted into the slot or cavity of the attachment clip. The support arm includes a notch or groove at the end opposite of the attachment plate. The notch or groove provides a structure to support the rod, including a curtain rod.

BRIEF DESCRIPTION OF THE DRAWINGS

A more complete appreciation of the invention is provided by reference to the following detailed description of the appended drawings and figures. The following descriptions, in conjunction with the appended figures, enable a person having skill in the art to recognize the numerous advantages and features of the invention by understanding the various embodiments. These drawings are provided to facilitate the reader's understanding of the invention and shall not be considered limiting of the breadth, scope, or applicability of the invention. It should be noted that for clarity and ease of illustration these drawings are not necessarily made to scale. The following figures are utilized to best illustrate these features.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIGS. 7A-7D are side views various embodiments of an attachment clip.

Figure 1:
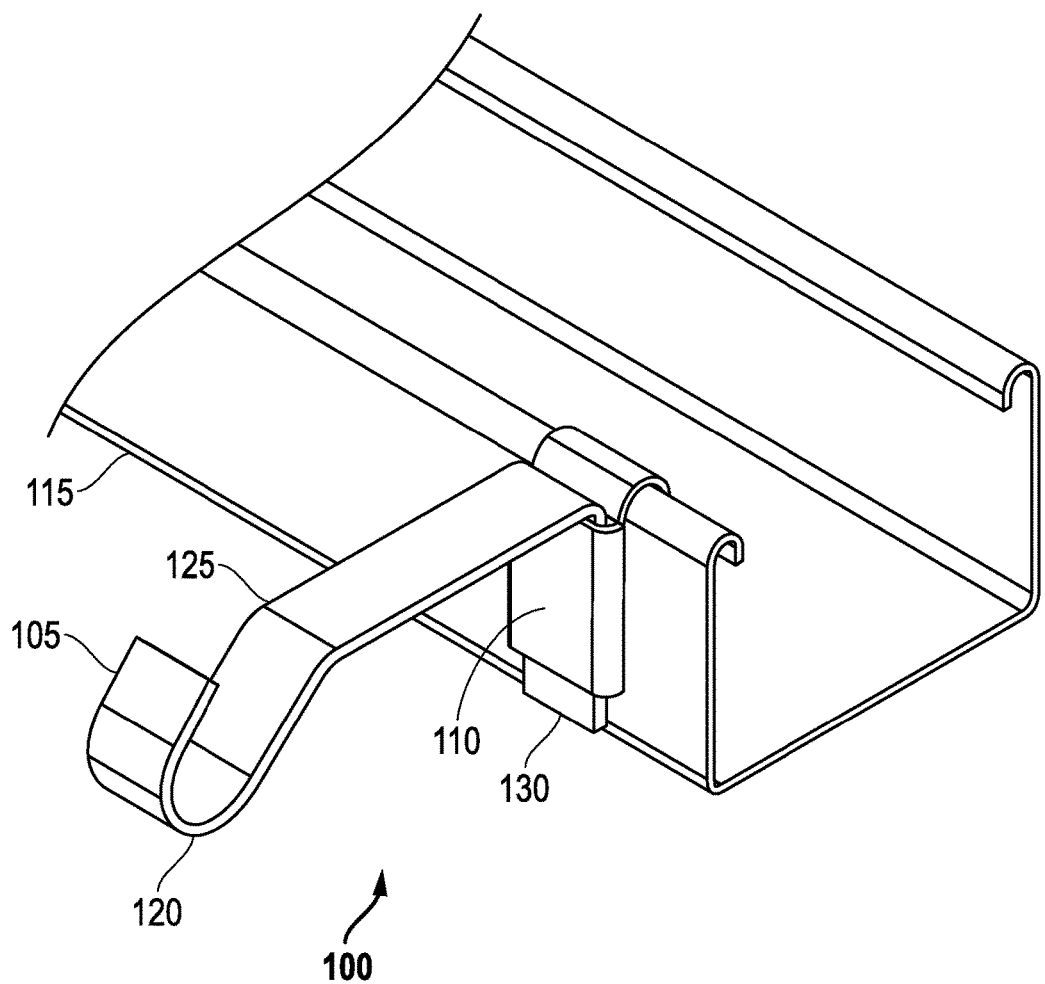
FIG. 1 is a perspective view of one embodiment of a rod hanging system including a window blind, a rod brace and an attachment clip.
Figure 2:
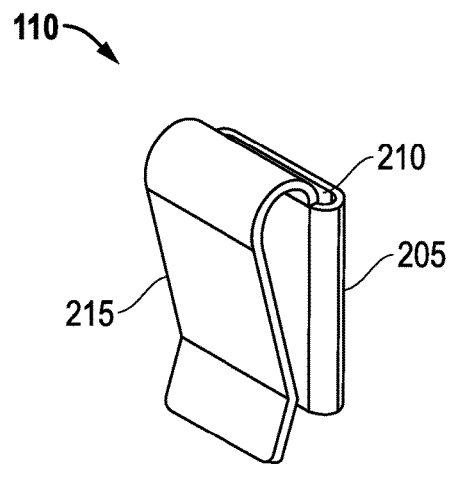
FIG. 2 is a perspective view of one embodiment of an attachment clip.
Figure 3:
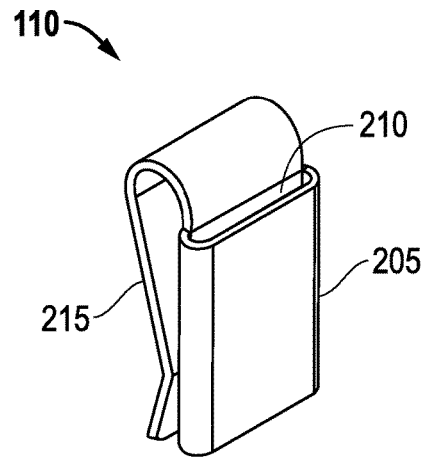
FIG. 3 is a perspective view of one embodiment of an attachment clip.
Figure 4:
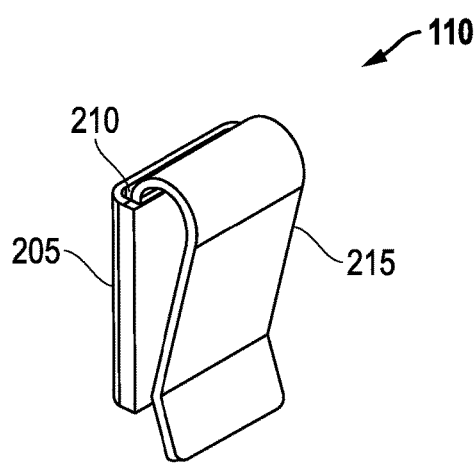
FIG. 4 is a perspective view of one embodiment of an attachment clip.
Figure 5:
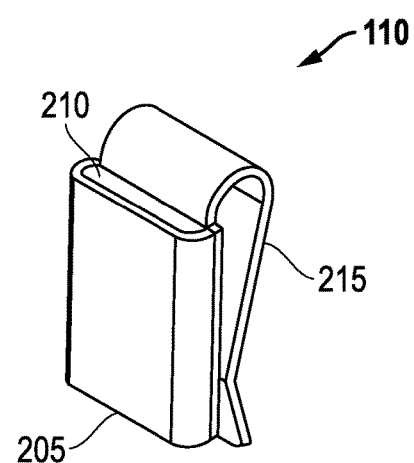
FIG. 5 is a perspective view of one embodiment of an attachment clip.
Figure 6A:
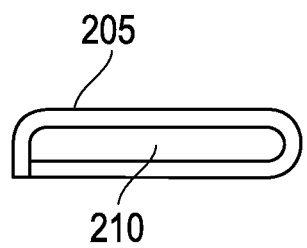
FIGS. 6A and 6B are side and top views of one embodiment of an attachment clip.
Figure 6B:
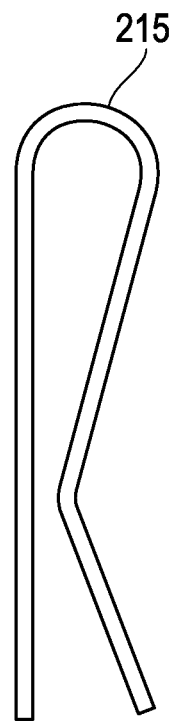
Figure 8:
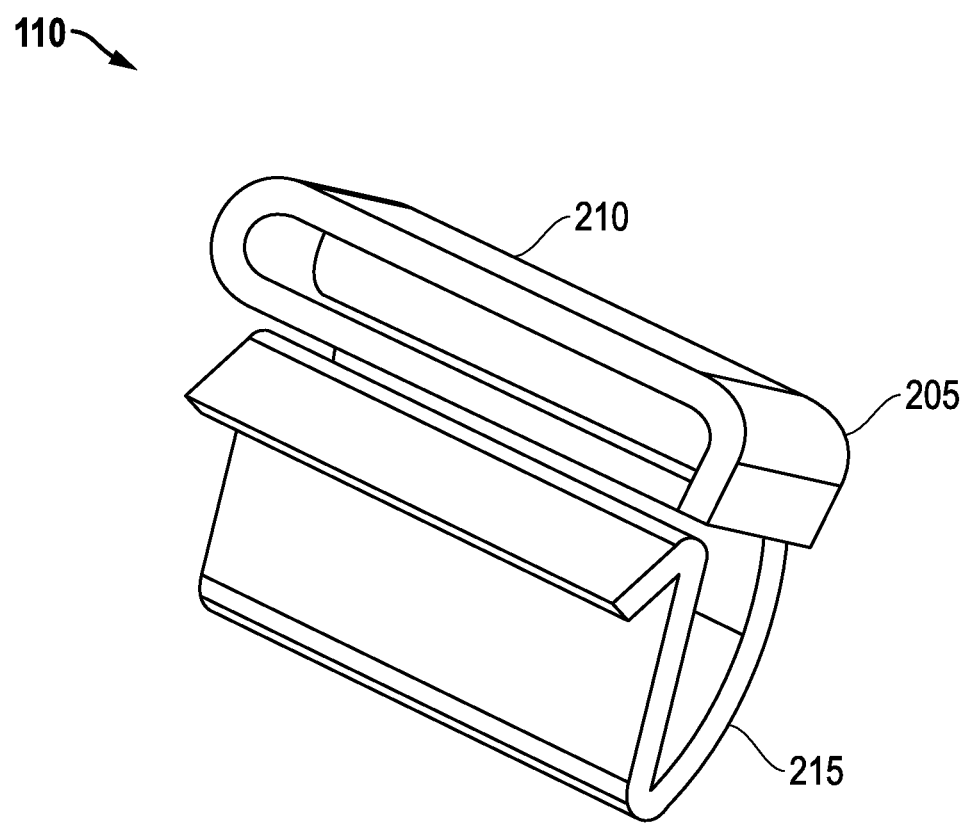
FIG. 8 is a top view of one embodiment of an attachment clip.
Figure 9:
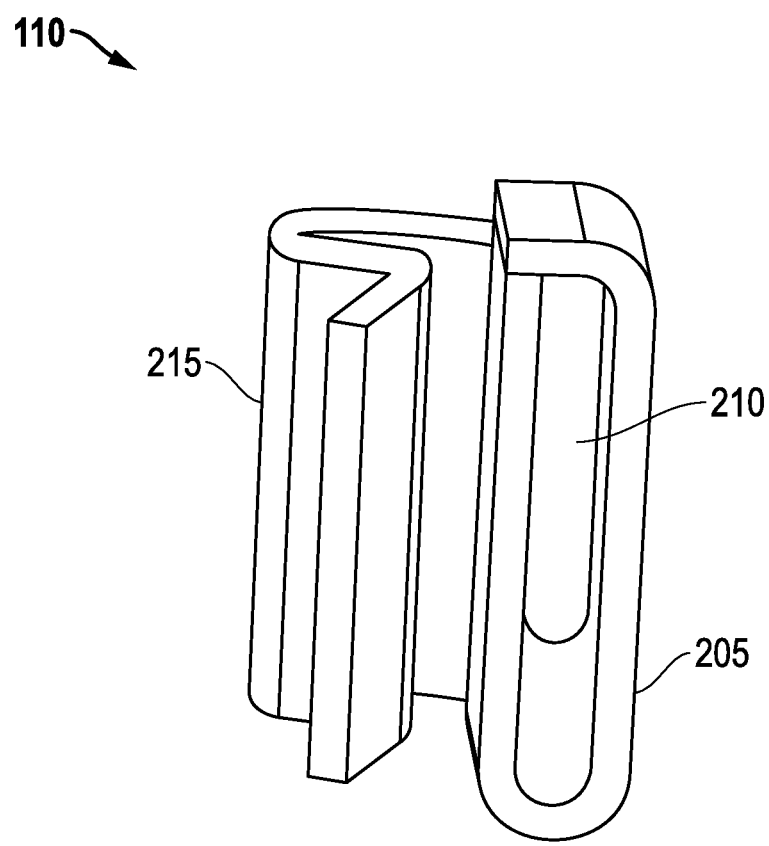
FIG. 9 is a bottom view of one embodiment of an attachment clip.
Figure 10:
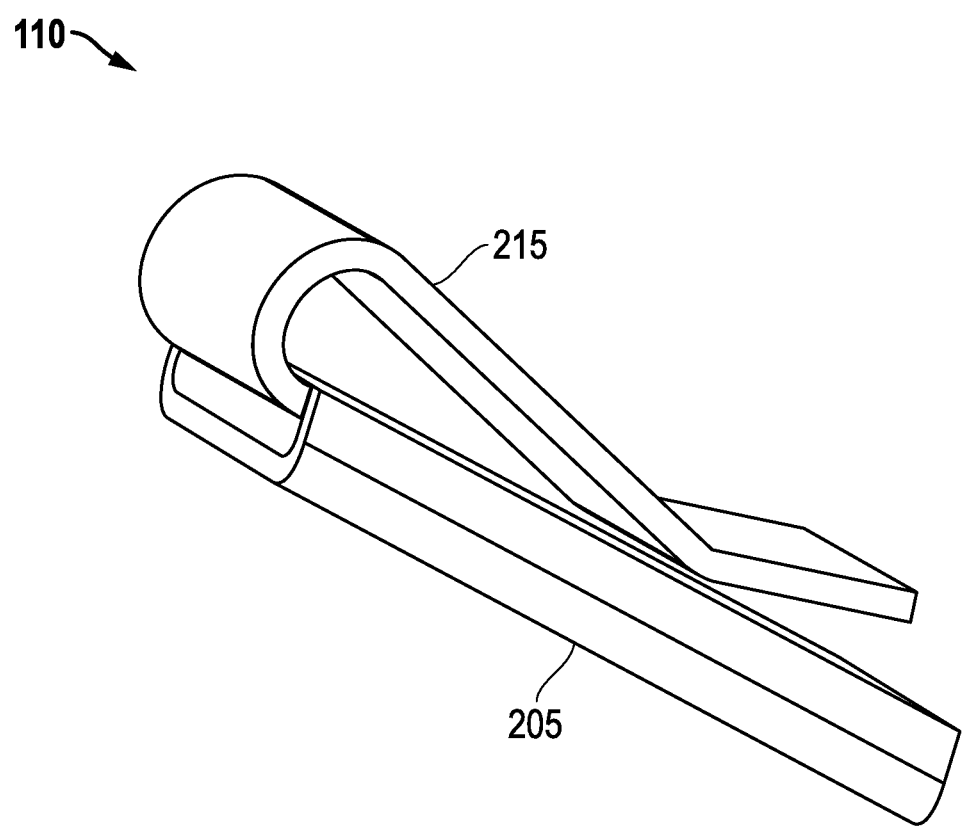
FIG. 10 is a perspective view of one embodiment of an attachment clip.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE INVENTION

A rod hanging system, according to one embodiment, is configured to allow easy, near-instant installation and further allow removability without marring of the wall surrounding the window. Referring now to FIGS. 1-10, various embodiments of the rod hanging system are shown. In one embodiment, the rod hanging system 100 includes an attachment or mounting clip 110 and a rod brace 105. The rod brace 105, in one embodiment, is an "L" shaped brace including an attachment plate 130 and an arm 125 substantially perpendicular to the attachment plate 130. The rod brace 105 may be formed from a variety of designs without detracting from the spirit of the invention, including but not limited to, a curved brace with an attachment plate end and an opposite rod attachment end. Further, the angle formed by the attachment place 130 and arm 125 may vary without detracting from the spirit of the invention, including but not limited to angles ranging from near zero to near one hundred eighty (180) degrees.

The arm 125 includes a groove 120 or indention or notch for supporting a rod. In one embodiment, the groove size is the same or greater than the diameter of the rod. The groove 120 may include a wide variety of shapes without detracting from the spirit of the invention, including but not limited to, a "V" shaped notch, a curved groove, a partially closed entrance groove, and a substantially half-circle groove. Additionally, the groove 120 may include a partially closed entrance with an entrance diameter less than the diameter of the groove 120. In this embodiment, a rod may be pushed through the partially closed entrance, in to the groove 120, through the use of physical force. Once the rod has been inserted, the partially closed entrance may lock or restrict the movement or removal of the rod. The rod brace 105 may be formed from a variety of materials, including but not limited to plastics, metal, and wood, and may be formed in a variety of sizes, including length, width, and thickness and may be formed in a variety of colors or textures without detracting from the spirit of the invention. A wide variety of articles, including but not limited to curtains, drapes, tapestries, and screens, may be hung from the rod without detracting from the spirit of the invention. Further, a wide variety of rod shapes, including varying widths and lengths, may be implemented without detracting from the spirit of the invention.

The attachment clip 110 includes a slot or cavity or chamber 205 for removably accepting and holding in place the attachment plate 130 of the rod brace 105. No fasteners, such as screws, are needed to attach the rod brace 105 to the attachment clip 110. The attachment plate 130 of the rod brace 105 may be inserted through both the bottom and top openings 210 of the slot or cavity or chamber 205 of the attachment clip 110. Additionally, in another embodiment, the attachment plate 130 of the rod brace 105 may be inserted only through the top opening 210 of the slot or cavity or chamber 205 of the attachment clip 110. In this embodiment, the attachment plate 130 is inserted to a stop point, including but not limited to the bottom edge of the attachment clip 110, within the cavity or slot or chamber 205. The size of the slot or cavity or chamber 205, in one embodiment, is marginally larger than the size of the attachment plate 130 of the rod brace 105. The size of the slot or cavity or chamber 205 may be formed in a variety of sizes, including the width, depth, and height, and may include a full enclosure or a partial enclosure without detracting from the spirit of the invention. In another embodiment, the attachment plate 130 may be snapped into a partial enclosed slot or cavity or chamber 205. In this embodiment, physical force is required to spread the un-enclosed portion of the slot or cavity or chamber 205, allowing the attachment plate 130 to be inserted. Once inserted, the slot or cavity or chamber 205 returns to its previous state, restricting or holding the attachment plate 130 in the slot or cavity or chamber 205.

The attachment clip 110 further includes a fastener 215 that attaches to a window blind 115 or to any mounted brace being used to hang an article, such as a metal plate. In one embodiment, the fastener 215 is formed from a spring clip, however, a wide variety of clips may be implemented without detracting from the spirit of the invention, including but not limited to magnetic clips. The attachment clip 110 fastener 215, according to one embodiment, is formed from a piece of metal that has been folded such that the two ends of the piece of metal are in close proximity to each other, forming a spring clip. In one embodiment, the attachment clip 110 fastener 215 resembles a "U" with the two ends pinched together. The attachment clip 110 may be removably attached to the window blind 115 with or without the rod brace 105 attached to the attachment clip 110. The attachment clip 110 may be removably attached to the window blind 115 by sliding the attachment clip 110 fastener 215 along a longitudinal edge of the window blind 115 or by forcing the attachment clip 110 fastener 215 over the longitudinal edge and onto the window blind 115. The attachment clip 110 fastener 215 may be forced onto the window blind 115 by aligning the two ends of the attachment clip 110 fastener 215 with the top edge of the window blind 115 and applying sufficient force to temporarily move apart the two ends of the attachment clip 110 fastener 215, allowing the attachment clip 110 to slide down onto the window blind 115.

In another embodiment, the attachment clip 110 fastener 215 ends are not in close proximity to each other. In this embodiment, the folded portion of the fastener approaches the unfolded portion at a point away from the ends of the fastener and the folded end may bend away from the main body of the fastener. The folded end may extend only a portion of the way along the length of the fastener or may extend to the other end of the fastener. Such embodiments are shown in FIGS. 6B and 7A-7D. The folded end may extend from only a small portion to nearly the entire portion of the length of the other end. In another embodiment, the folded end may be formed to turn approximately 90 degrees as the folded end nears the other end. Such an embodiment is shown in FIGS. 1-10. This embodiment allows a simpler alignment of the attachment clip 110 to the window blind 115 before forcing the attachment clip 110 down onto the window blind 115.

In one embodiment, the attachment clip 110 fastener 215 and slot or cavity or chamber 205 are formed from a single piece of material. In another embodiment, the attachment clip 110 fastener 215 and slot or cavity or chamber 205 are formed from separate pieces of material and are fixedly attached or permanently attached to each other. In another embodiment, the fastener 215 is formed from a continuous piece of material. In yet another embodiment, the fastener 215 is formed from separate pieces of material. In other embodiments, the folded end of the attachment clip 110 fastener 215 is between 0.69-1.557 inches long, the curved portion of the attachment clip 110 fastener 215 is 0.363 inches wide, and the slot or cavity or chamber 205 is 0.172 inches deep and 0.735 inches wide. In another embodiment, the folded end may extend beyond the other end as shown in FIG. 1.

In another embodiment, the attachment clip 110 is formed from a plastic material. In such an embodiment, the folded attachment clip 110 fastener 215 is formed in the folded formation and does not require the bending of a substantially straight piece.

Although the invention is described herein with reference to specific embodiments, various modifications and changes can be made without departing from the scope of the invention as set forth in the claims below. Accordingly, the specification and figures are to be regarded in an illustrative rather than a restrictive sense, and all such modifications are intended to be included within the scope of the invention. Any benefits, advantages, or solutions to problems that are described herein with regard to specific embodiments are not intended to be construed as a critical, required, or essential feature or element of any or all the claims.

From time-to-time, the invention is described herein in terms of these example embodiments. Description in terms of these embodiments is provided to allow the various features and embodiments of the invention to be portrayed in the context of an exemplary application. After reading this description, it will become apparent to one of ordinary skill in the art how the invention can be implemented in different and alternative environments. Unless defined otherwise, all technical and scientific terms used herein have the same meaning as is commonly understood by one of ordinary skill in the art to which this invention belongs.

The following discussion is presented to enable a person skilled in the art to make and use the invention. The general principles described herein may be applied to embodiments and applications other than those detailed below without departing from the spirit and scope of the invention as defined by the appended claims. The invention is not intended to be limited to the embodiments shown, but is to be accorded the widest scope consistent with the principles and features disclosed herein.

In addition, while a particular feature of the invention may have been disclosed with respect to only one of several embodiments, such feature may be combined with one or more other features of the other embodiments as may be desired. It is therefore, contemplated that the claims will cover any such modifications or embodiments that fall within the true scope of the invention.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one", "one or more" or the like; and adjectives such as "conventional", "traditional", "normal", "standard", "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more", "at least", "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A rod hanging system for use with window blinds, the rod hanging system comprising:
    a rod brace comprising an attachment plate and a support arm with a rod notch;
    a mounting clip comprising an enclosed cavity, wherein the enclosed cavity has a top and a bottom, and wherein the top of the enclosed cavity removably receives the attachment plate of the rod brace;
    wherein the mounting clip further comprises a spring clip attachment member that removably clasps the window blinds.

2. The rod hanging system of claim 1, wherein the attachment plate is substantially perpendicular to the support arm.

3. The rod hanging system of claim 1, wherein the attachment plate and support arm are formed from a continuous piece of material.

4. The rod hanging system of claim 1, wherein the rod notch is a curved groove.

5. The rod hanging system of claim 4, wherein the curved groove is a semicircular groove.

6. The rod hanging system of claim 1, wherein the enclosed cavity has an opening at the top of the mounting clip.

7. The rod hanging system of claim 6, wherein the enclosed cavity has an opening at the bottom of the mounting clip.

8. The rod hanging system of claim 1, wherein the attachment plate extends through the enclosed cavity until the rod brace contacts the mounting clip.

9. The rod hanging system of claim 1, wherein the attachment plate extends through the enclosed cavity until the rod brace contacts the bottom of the mounting clip.

10. The rod hanging system of claim 1, wherein the attachment plate extends through the enclosed cavity until the rod brace contacts a stop point of the mounting clip.

11. The rod hanging system of claim 10, wherein the attachment plate extends above the mounting clip.

12. The rod hanging system of claim 11, wherein the attachment plate extends at least two inches above the mounting clip.

13. The rod hanging system of claim 11, wherein the rod brace does not contact the mounting clip.

14. The rod hanging system of claim 1, wherein the spring clip attachment member is formed from a continuous piece of material.

15. The rod hanging system of claim 1, wherein the spring clip attachment member is formed from at least two pieces of material.

16. The rod hanging system of claim 1, wherein the spring clip attachment member is slid along the longitudinal edge of the window blind to clasp the attachment member to the window blind.

17. The rod hanging system of claim 1, wherein the spring clip attachment member is forced onto the window blind by applying force on the attachment member to separate the spring clip.

18. The rod hanging system of claim 1, wherein the spring clip attachment member forms a U-Shaped clip.

19. The rod hanging system of claim 1, wherein the mounting clip is formed from metal.

* * * * *